United States Patent
Schöne

(10) Patent No.: US 10,174,900 B2
(45) Date of Patent: Jan. 8, 2019

(54) LIGHTING APPARATUS FOR VEHICLES

(71) Applicant: Hella KGaA Hueck & Co., Lippstadt (DE)

(72) Inventor: Michael Schöne, Lippstadt (DE)

(73) Assignee: Hella GmbH & Co. KGaA, Lippstadt (DE)

(*) Notice: Subject to any disclaimer, the term of this patent is extended or adjusted under 35 U.S.C. 154(b) by 7 days.

(21) Appl. No.: 15/506,033

(22) PCT Filed: Aug. 12, 2015

(86) PCT No.: PCT/EP2015/068582
§ 371 (c)(1),
(2) Date: Feb. 23, 2017

(87) PCT Pub. No.: WO2016/037789
PCT Pub. Date: Mar. 17, 2016

(65) Prior Publication Data
US 2017/0307165 A1 Oct. 26, 2017

(30) Foreign Application Priority Data
Sep. 9, 2014 (DE) .......................... 10 2014 112 937

(51) Int. Cl.
*F21S 41/275* (2018.01)
*G02B 27/42* (2006.01)
(Continued)

(52) U.S. Cl.
CPC ........... *F21S 41/275* (2018.01); *F21S 41/143* (2018.01); *F21S 41/663* (2018.01);
(Continued)

(58) Field of Classification Search
CPC ...... F21S 41/275; F21S 41/663; F21S 41/143; G02B 27/4272; G02B 27/4277; G02B 27/4283; G02B 27/2494; G02B 13/14
(Continued)

(56) References Cited

U.S. PATENT DOCUMENTS 5,737,120 A * 4/1998 Arriola ..................... G02B 5/32
359/16
8,696,180 B2 * 4/2014 Ishida ................... F21S 41/143
362/507
(Continued)

FOREIGN PATENT DOCUMENTS

| DE | 102010027322 A1 | 1/2012 |
| EP | 1072906 A2 | 1/2001 |
| EP | 2306074 A2 | 4/2011 |

OTHER PUBLICATIONS

Computer Translation of EP 2306074; pp. 1-15, undated.*

*Primary Examiner* — Laura Tso
(74) *Attorney, Agent, or Firm* — Husch Blackwell LLP

(57) ABSTRACT

A lighting apparatus for vehicles with a number of semiconductor-based light sources and a projection device for generating the specified light distribution with a cut-off line. The projection device features a correction device with at least two lenses. The surface of at least one of the lenses is designed as a diffractive lens surface for achromatization in a visible wavelength range. The two lenses are made from different lens materials. The surfaces of at least two lenses are designed as refractive lens surfaces that have their optical power calculated based on a temperature range and/or expansion coefficient of the lens material of at least two lenses such that adding the optical power of the lenses yields a predefined total optical power of the correction device.

18 Claims, 3 Drawing Sheets

(51) Int. Cl.
*F21S 41/143* (2018.01)
*F21S 41/663* (2018.01)
*G02B 13/14* (2006.01)

(52) U.S. Cl.
CPC ..... *G02B 27/4272* (2013.01); *G02B 27/4277* (2013.01); *G02B 27/4283* (2013.01); *G02B 27/4294* (2013.01); *G02B 13/14* (2013.01)

(58) Field of Classification Search
USPC ........................................ 362/520, 521, 522
See application file for complete search history.

(56) References Cited

U.S. PATENT DOCUMENTS

| | | | |
|---|---|---|---|
| 8,974,101 B2* | 3/2015 | Koizumi | F21S 48/215 362/522 |
| 2011/0164429 A1* | 7/2011 | Heym | B60Q 3/44 362/471 |
| 2013/0039087 A1* | 2/2013 | Gasquet | B60Q 3/745 362/521 |
| 2013/0208493 A1* | 8/2013 | Kloos | G02B 19/0014 362/521 |
| 2014/0029287 A1* | 1/2014 | Anzai | F21S 48/1283 362/521 |
| 2015/0023043 A1* | 1/2015 | Yang | B60Q 1/22 362/521 |
| 2015/0029740 A1* | 1/2015 | Na | F21S 48/1225 362/521 |

* cited by examiner

LIGHTING APPARATUS FOR VEHICLES

CROSS REFERENCE

This application claims priority to PCT Patent Application No. PCT/EP2015/068582, filed 12 Aug. 2015, which itself claims priority to German Application No. 10 2014 112937.7, filed 9 Sep. 2014, the entirety of both of which are hereby incorporated by reference.

FIELD OF THE INVENTION

This Invention is a lighting apparatus for vehicles with a number of semiconductor-based light sources and a projection device for generating the specified light distribution with a cut-off line.

BACKAROUND OF THE INVENTION

Patent DE 10 2010 027 322 A1 specifies a lighting apparatus for vehicles that features a number of light sources arranged in a matrix structure and a projection unit assigned to the light sources so a specified light distribution can be generated. The projection unit can feature a secondary optical component consisting of one lens and one primary optical component arranged between the secondary optical component and the light sources. Unwanted color fringes often form at a cut-off line of the light distribution generated by the projection unit. Especially in cases in which the projection unit features components made of plastic, such as PMMA, PC or LSR, the refractive index of the projection unit changes more substantially due to the temperature. Within the relatively wide temperature range of −50° C. through 150° C. in which the lighting apparatus is operated, the focal point shifts several millimeters. This causes the depiction of the cut-off line to be blurry.

U.S. Pat. No. 5,737,120 A stipulates a projection unit that consists of two lenses, wherein one of the two lenses has a diffractive lens surface. However, the resulting achromatization relates to infrared radiation in a wavelength range of 8 μm through 12 μm. The two lenses are produced from different materials. This reduces thermal influences. A disadvantage of this well-known projection unit is that it cannot be used for lighting apparatus in the automotive sector.

SUMMARY OF THE INVENTION

Therefore, the purpose of this invention is to further develop a lighting apparatus for vehicles with a number of semiconductor-based light sources and a projection device for generating the specified light distribution such that thermal and chromatic perturbations are reduced or offset.

In an effort to fulfill this purpose, this invention is included under the broader term "Patent claim 1", wherein the projection device features a correction device with at least two lenses, where the surface of at least one of the lenses is designed as a diffractive lens surface for achromatization in a visible wavelength range,
wherein the two lenses are made from different lens materials,
wherein the surfaces of at least two lenses are designed as refractive lens surfaces that have their optical power calculated based on a temperature range and/or expansion coefficient of the lens material of at least two lenses such that adding the optical power of the lenses yields a predefined total optical power of the correction device.

The main advantage of this invention is that the inventive correction device offsets top-level thermal and chromatic influences. The optical power of the optical system stabilizes. This process decouples the system from most thermal influences. Chromatic effects are reduced substantially, and this effect can be further optimized by choosing from at least two different wavelengths within the light source spectrum. Though the differences between the refractive indices are greater within the visible wavelength range (380 nm through 780 nm), achromatization within this spectral range is advantageous. The use of athermalization is not limited to glass lens material. It can also used for plastic lens materials. Athermalization occurs in a temperature range from −50° C. through 150° C. This is the typical temperature range for vehicle lighting operation.

In a preferred embodiment of this invention, the correction device features a first lens and a second lens which each have a diffractive lens surface and a refractive lens surface. The diffractive lens surface and/or refractive lens surface can have a spherical or aspherical design. An aspherical design can compensate for spherical and other aberrations. The shape of the correction device is specially designed to optimize coupling of the two lenses, minimizing Fresnel losses as well as adjustment and assembly work.

In a preferred embodiment of this invention, the sides of the first and second lenses facing one another are directly adjacent. Ideally, the contact face is level with and perpendicular to the optical axis. The surface of the first lens facing toward the light source and the surface of the second lens facing away from the light source each have a diffractive lens surface and refractive lens surface. The diffractive structure is applied to the curved area/surface, directly coupling both lenses with one another on their flat sides. Fresnel losses on both lens bounding surfaces facing toward one another can be reduced because the light does not have to travel through the air from the first lens to second lens. This reduces adjustment work because only one of the two lenses needs to be aligned with the rest of the system.

Further development of this invention has reduced Fresnel losses even more by inserting at least one material layer between the first and second lenses. This material has a refractive index that lies between that of the first lens and that of the second lens.

In further development of this invention, the correction device is designed as a secondary optical component assigned to the light sources arranged in a matrix structure and also to the primary optical components positioned at the front that are assigned to the same light sources. The correction device combines the features of thermal/chromatic influence compensation and projection of light beams transmitted from the light sources.

In further development of this invention, the correction device is designed as a primary optical component assigned to each of the light sources arranged in a matrix structure. Ideally, a secondary optical component is arranged in front of the light sources and primary optical components in the main direction of the beam as a lens array. Ideally, in this embodiment, the correction device is used to compensate for thermal and chromatic influences. Preferably, the stipulated light distribution is projected through the secondary lens.

In further development of the invention, the optical power of the refractive lens surfaces is calculated by determining the ratio of one type of optical power (the refractive optical power or diffractive optical power of various lenses to one other yielded from an Abbe or athermalization equation). The individual optical power values can even be determined using an equation for the total optical power.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
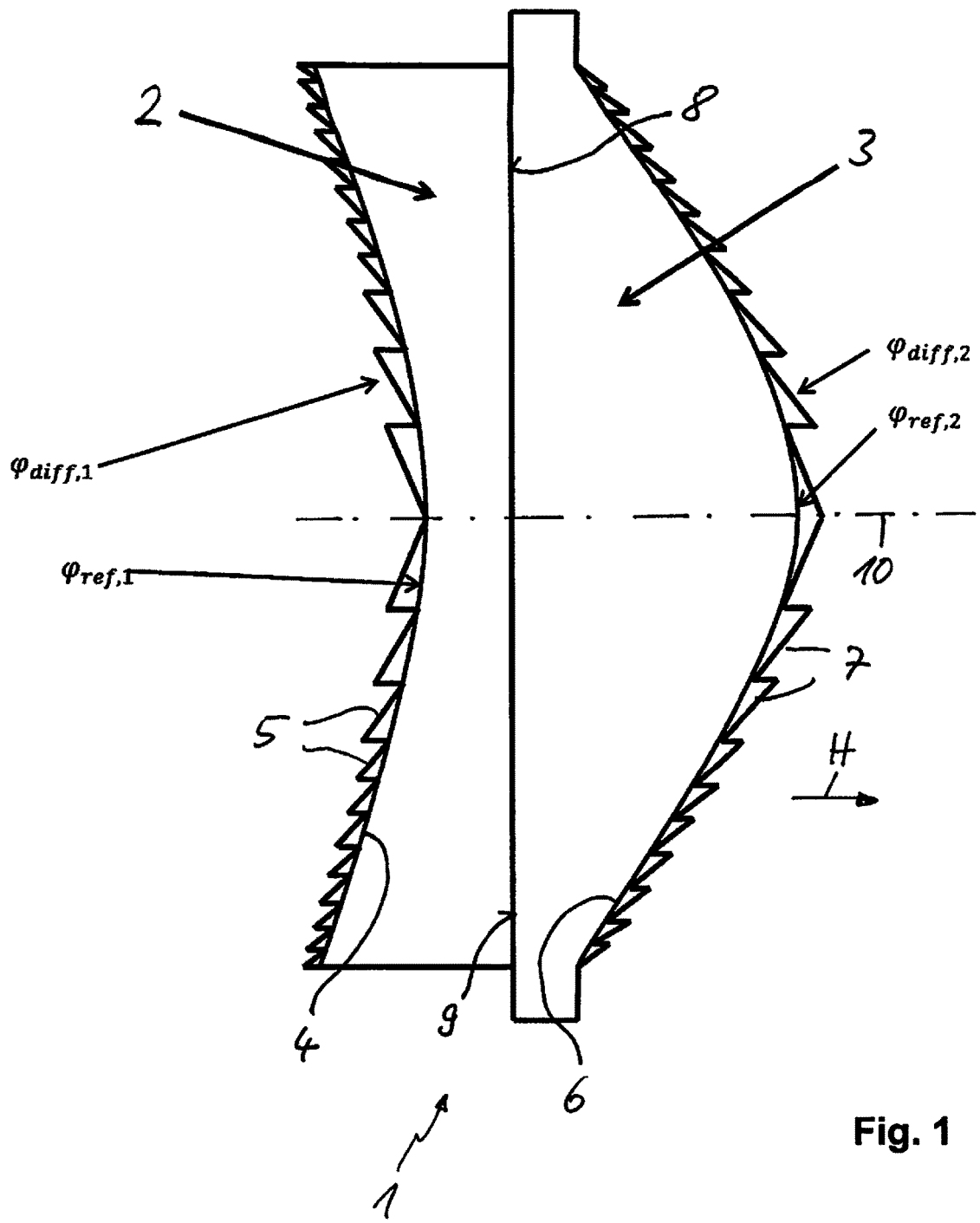
FIG. 1 is a schematic side view of a correction device (initial embodiment).

A lighting apparatus for vehicles can be designed as headlamp in the front area or as a combination rear lamp. At the front of a vehicle, the lighting apparatus can be used to generate low-beam light, glare-free high-beam light or other light distribution patterns, such as highway light, city driving light, etc. The light distribution typically has a cut-off line.

To prevent formation of a color fringe at the cut-off line or to reduce thermal influences resulting from the operating temperature of the lighting apparatus lying within a specified temperature range (−50° C. through 150° C.), a correction device (1) is integrated into the lighting apparatus. This correction device has a one-piece design in accordance with the first embodiment of the invention (shown in FIG. 1). This correction device (1) is part of a projection unit that projects transmitted light from a number of semiconductor-based light sources (not shown) according to the specified light distribution. In this sample embodiment, the correction device (1) is the projection device.

The correction device (1) features a first lens (2) on the side facing toward the light source and a second lens (3) on the side facing away from the light source. The second lens (3) is arranged in front of the first lens (2) in the main direction of the beam H.

The first lens (2) features a surface that faces toward one of the light sources and consists of a refractive lens surface (4) and a diffractive lens surface (5). The refractive lens surface (4) is designed such that the corrective device (1) is athermal. The refractive lens surface (4) has a spherical design. Alternatively, it can be designed to be aspherical. The refractive lens surface (4) features an optical power of $\varphi_{ref}^1$ that bends the design inward. The diffractive lens surface (5) is structured such that the corrective device (1) is achromatic. The diffractive lens surface (5) is designed as a Fresnel structure and features an optical power of $\varphi_{diff}^1$.

The surface on the side of the second lens (3) that faces away from the light source bends outward. The surface features a refractive lens surface (6) that is designed such that the corrective device is athermal. The refractive lens surface (6) features an optical power of $\varphi_{ref}^2$. The surface also features a diffractive lens surface (7) that is structured such that the corrective device (1) is achromatic. The diffractive lens surface (7) features a Fresnel structure with an optical power of $\varphi_{diff}^2$.

The sides of the first lens (2) and second lens (3) facing one another are directly adjacent. The sides of the first lens (2) and the second lens (3) facing one another each have a flat surface (8 and 9). The two surfaces (8, 9) run perpendicular to an optical axis (10) of the correction device (1). The surface (8) of the first lens (2) and the surface (9) of the second lens (3) can be firmly bonded, particularly through adhesion. As such, the first lens (2) and second lens (3) form a hybrid lens.

The first lens (2) and second lens (3) are made from different materials (more specifically, from various plastic materials with different expansion coefficients).

One embodiment of the invention (not shown) also allows for a material layer to be inserted between the surface (8) of the first lens (2) and the surface (9) of the second lens (3) that has a refractive index n that lies between a refractive index $n_1$ of the first lens (2) and a refractive index $n_2$ of the second lens (3). In this case, there is also no air medium between the first lens (2) and the second lens (3).

Figure 2:
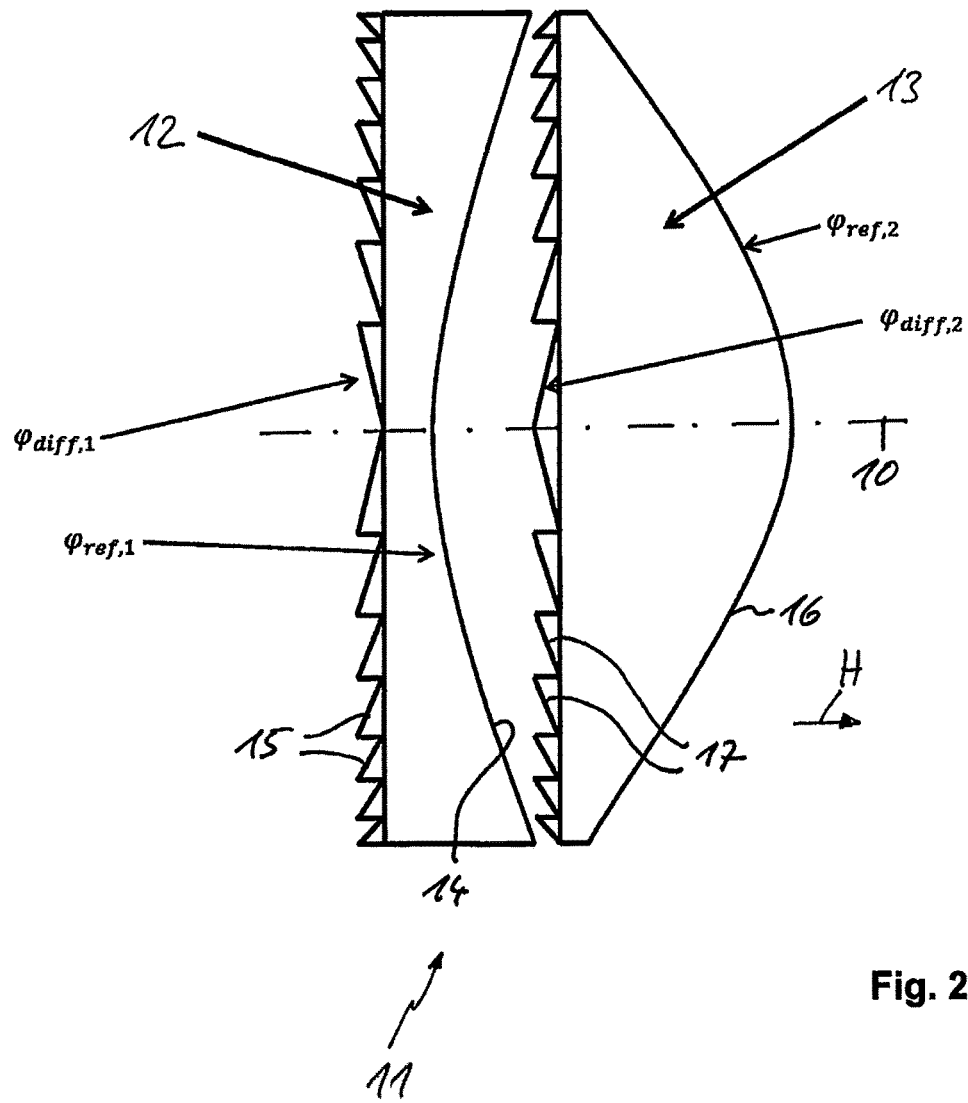
FIG. 2 is a schematic side view of this correction device (second embodiment).

In a second embodiment of a correction device (11) (shown in FIG. 2), a first lens (12) is arranged on a side facing toward the light source and a second lens (13) is arranged on a side facing away from the light source. In this arrangement, the second lens (13) is placed at a distance from the first lens (12). The side of the first lens (12) facing away from the light source is a refractive lens surface (14) bent inward and the side of this lens facing toward the light source is a diffractive lens surface (15). The refractive lens surface (14) features an optical power of $\varphi_{ref}^1$ and the diffractive lens surface (15) an optical power of $\varphi_{diff}^1$. The surface of the first lens (12) facing toward the light source is designed so that it is mostly level and perpendicular to the optical axis (10). The surface (Fresnel) structures shown in FIG. 1 and FIG. 2 are enlarged for easier understanding and do not correspond to the actual dimensions and design.

In accordance with the first and second embodiments, identical functions of the various lenses are assigned identical reference symbols.

A surface of the second lens (13) that is facing away from the light source is a refractive lens surface (16) that is bent outward and features an optimal power of $\varphi_{ref}^2$. A surface of the second lens (13) facing toward the light source is a diffractive lens surface (17) that features an optical power of $\varphi_{diff}^2$. Like the surface of the first lens (12) facing toward the light source, the surface of the second lens (13) facing toward the light source is designed and arranged so that it is mostly level and perpendicular to the optical axis (10).

The method for determining the optical power $\varphi_{ref}^1$, $\varphi_{ref}^2$, $\varphi_{diff}^1$, $\varphi_{diff}^2$ of the first lenses (2, 12) and second lenses (3, 13) is described below using an example. In this example, the diffractive structure causes achromatization.

The equations (1), (2) are the starting point for the optical power values $\varphi_{ref}$ and $\varphi_{diff}$:

$$\varphi_{ref} = \frac{n-1}{R} \quad (1)$$

$$\varphi_{diff} = \frac{2 \cdot \lambda}{r^2 - \lambda^2} \propto \frac{2 \cdot \lambda}{r^2} \quad (2)$$

This yields the total optical power $\varphi$ of the correction device (1, 11)

$$\varphi = \sum_i \varphi_i = \sum_{i=1}^{2} (\varphi_{ref,i} + \varphi_{diff,i}) = \left(\frac{n_1 - 1}{R_1} + \frac{2 \cdot \lambda_0}{r_1^2}\right) + \left(\frac{n_2 - 1}{R_2} + \frac{2 \cdot \lambda_0}{r_2^2}\right) \stackrel{def}{=} const, \quad (3)$$

where R is the refractive index n and the curvature radius of the bent spherical surfaces and r is the zone radius of the first Fresnel zone of the diffractive surfaces $$n_i := n_i(\lambda_0, T_0) \tag{4}$$

$$R_i := R_i(T_0) \tag{5}$$

$$r_i := r_i(T_0). \tag{6}$$

Achromatization is caused by the diffractive lens surfaces (5, 7 or 15, 17) of the lenses (2, 3 or 12, 13). The following condition applies to both lenses to ensure that two refractive lens surfaces (4, 6; or 14, 16) and two diffractive lens surfaces (5, 7 or 15, 17) can be used to correct two wavelengths (Abbe equation):

$$\Delta\varphi_i(\lambda, T_0) = \frac{n_i(\lambda_1) - n_i(\lambda_2)}{n_i(\lambda_0) - 1} \cdot \varphi_{ref,i} + \frac{\lambda_1 - \lambda_2}{\lambda_0} \cdot \varphi_{diff,i} \stackrel{def}{=} 0 \tag{7}$$

The following conditions must be met for athermalization (athermalization equation):

$$\Delta\varphi_i(\lambda_0, T) = \sum_{i=1}^{2} \left( \left( \frac{n_i(T_1) - n_i(T_0)}{n_i(T_0) - 1} - \alpha_i \cdot (T_1 - T_0) \right) \cdot \varphi_{ref,i} - 2 \cdot \alpha_i \cdot (T_1 - T_0) \cdot \varphi_{diff,i} \right) \stackrel{def}{=} 0, \tag{8}$$

where $\alpha_i$ is the expansion coefficient of the respective lens material and $T_1$ is a temperature.

The following substitutions are yielded from the equation (7):

$$v_{ref,i}^{-1,\lambda} := \frac{n_i(\lambda_1) - n_i(\lambda_2)}{n_i(\lambda_0) - 1} \tag{9}$$

$$v_{diff,i}^{-1,\lambda} := \frac{\lambda_1 - \lambda_2}{\lambda_0} \tag{10}$$

The following substitutions are yielded from the equation (8):

$$v_{ref,i}^{-1,T} := \frac{n_i(T_1) - n_i(T_0)}{n_i(T_0) - 1} - \alpha_i \cdot (T_1 - T_0) \tag{11}$$

$$v_{diff,i}^{-1,T} := -2 \cdot \alpha_i \cdot (T_1 - T_0) \tag{12}$$

Converting the equation (7) yields the following relationship:

$$\varphi_{diff,i} = -\frac{v_{ref,i}^{-1,\lambda}}{v_{diff,i}^{-1,\lambda}} \cdot \varphi_{ref,i} \tag{13}$$

Insertion into the athermalization equation (8) yields the following relationship between $\varphi_{ref}^1$ of the first lens (2, 12) and $\varphi_{ref}^2$ of the second lens (3, 13):

$$\varphi_{ref,1} = \frac{v_{diff,2}^{-1,T} \cdot \frac{v_{ref,2}^{-1,\lambda}}{v_{diff,2}^{-1,\lambda}} - v_{ref,2}^{-1,T}}{v_{ref,1}^{-1,T} - v_{diff,1}^{-1,T} \cdot \frac{v_{ref,1}^{-1,\lambda}}{v_{diff,1}^{-1,\lambda}}} \cdot \varphi_{ref,2} \tag{14}$$

The Abbe equation (7) also yields a ratio between $\varphi_{diff}^2$ and $\varphi_{ref}^2$:

$$\varphi_{diff,2} = -\frac{v_{ref,2}^{-1,\lambda}}{v_{diff,2}^{-1,\lambda}} \cdot \varphi_{ref,2} \tag{15}$$

Inserting this equation (13), (14), (15) into the equation (3) for the total optical power $\varphi$ allows for a conversion of this value according to $\varphi_{ref}^2$:

$$\varphi_{ref,2} = \tag{16}$$

$$\left( 1 - \frac{v_{ref,2}^{-1,\lambda}}{v_{diff,2}^{-1,\lambda}} + \frac{1 - \frac{v_{ref,1}^{-1,\lambda}}{v_{diff,1}^{-1,\lambda}}}{v_{ref,1}^{-1,T} - v_{diff,1}^{-1,T} \cdot \frac{v_{ref,1}^{-1,\lambda}}{v_{diff,1}^{-1,\lambda}}} \cdot \left( v_{diff,2}^{-1,T} \cdot \frac{v_{ref,2}^{-1,\lambda}}{v_{diff,2}^{-1,\lambda}} - v_{ref,2}^{-1,T} \right) \right)^{-1} \cdot \varphi$$

The other optical power values $\varphi_{ref}^1$, $\varphi_{diff}^1$, $\varphi_{diff}^2$ can be calculated accordingly.

The values for the first lens (2, 12) und second lens (3, 13) calculated using this method enable compensation for top-level thermal and chromatic influences.

Figure 3:
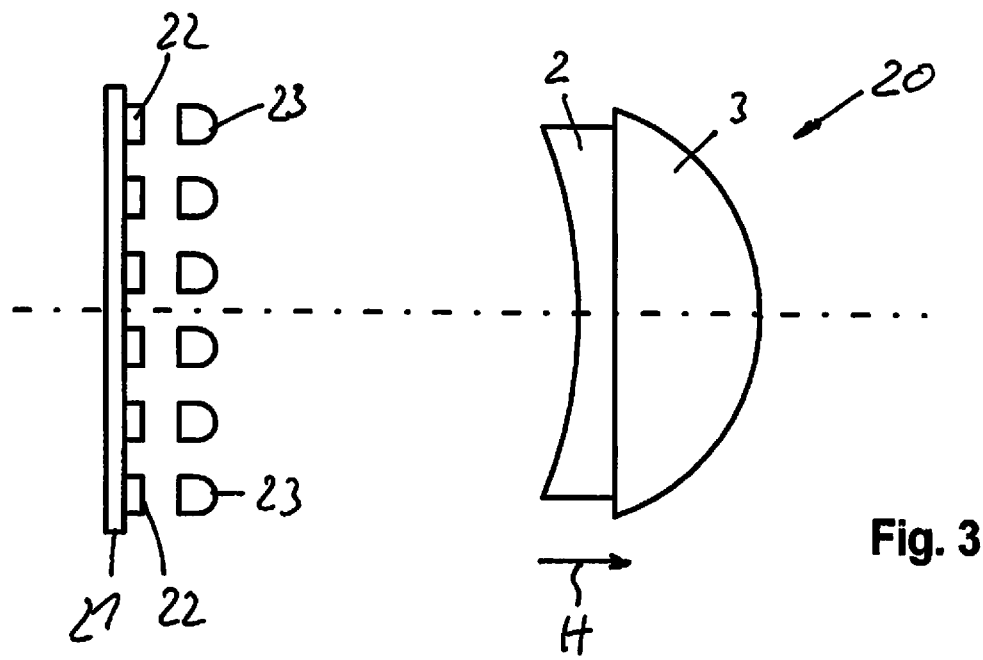
FIG. 3 is a schematic side view of a lighting apparatus with light sources arranged in a matrix structure and the correction device as a secondary optical component.

In another embodiment of this invention (shown in FIG. 3), the correction device (1) is designed as a secondary optical component (20) that is assigned to most of the light sources (22) arranged in a matrix structure on a carrier plate (21). Ideally, the light sources (22) are designed as LED light sources and a primary optical component (23) is arranged in front of each in the main direction of the beam H.

Figure 4:
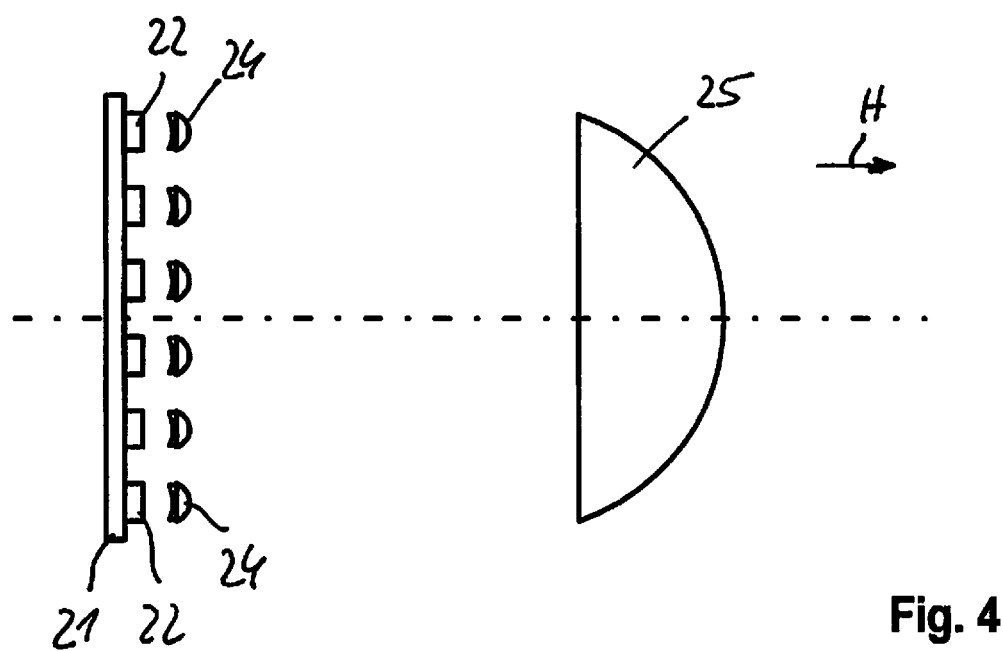
FIG. 4 is a schematic side view of the lighting apparatus with light sources arranged in a matrix structure and the correction device as a primary optical component.

In an alternative embodiment of this invention (shown in FIG. 4), the correction device (1) can be designed as a primary optical component (24) that is assigned to each of the light sources (22). Relatively speaking, the correction device (1) in this variant of the invention is smaller than the embodiments shown in FIGS. 1 through 3. A secondary optical component (25) designed as a lens is arranged in front of the primary optical components (24) in the main direction of the beam H. This secondary optical component ensures that the stipulated light distribution is achieved.

In an alternative embodiment of this invention (not shown), the correction device (1) can have more than two lenses. Ideally, the correction device (1) has at least two refractive lens surfaces.

In an alternative embodiment (not shown), the diffractive structure of the first lens (2, 12) or the second lens (3, 13) can cause athermalization. In this embodiment, the refractive optical power causes achromatization. In the equation (13), the expression λ would be replaced with T and in the equation (14), the expression T with λ. Accordingly, the Abbe equation (7) and athermalization equation (8) are substituted for one another. Even top-level thermal and chromatic influences are offset in this embodiment. Nevertheless, this requires more lens material, so the embodiment mentioned above is still preferable.

LIST OF REFERENCE SYMBOLS

1 Correction device
2 First lens
3 Second lens
4 Refractive lens surface
5 Diffractive lens surface
6 Refractive lens surface
7 Diffractive lens surface
8 Flat surface
9 Flat surface
10 Optical axis
11 Correction Device
12 First lens
13 Second lens
14 Refractive lens surface
15 Diffractive lens surface
16 Refractive lens surface
17 Diffractive lens surface
21 Carrier plate
22 Light sources
23 Primary optical component
24 Primary optical component
25 Secondary optical component
H Main direction of beam
n, $n_1$, Refractive index
$n_2$

The invention claimed is:

1. A lighting apparatus for vehicles comprising:
a plurality of semiconductor-based light sources;
a projection device for generating a specified light distribution;
a correction device of the projection device, said correction device having at least two lenses, wherein at least two of said at least two lenses are made from different materials from one another, where the surface of at least one of the lenses is designed as a diffractive lens surface featuring a Fresnel structure for achromatization in a visible wavelength range,
wherein the surfaces of at least two lenses are designed as refractive lens surfaces that have their optical power ($\varphi_{ref}^1$, $\varphi_{ref}^2$) calculated based on at least one of a temperature range and expansion coefficient of the lens material of at least two lenses such that adding the optical power ($\varphi_{ref}^1$, $\varphi_{ref}^2$, $\varphi_{diff}^1$, $\varphi_{diff}^2$) of the lenses yields a predefined total optical power ($\varphi$) of the correction device.

2. The lighting apparatus in accordance with claim 1, wherein the refractive lens surface is designed such that the correction device is athermal.

3. The lighting apparatus in accordance with claim 1, wherein the refractive lens surface is designed such that it is aspherical or spherical.

4. The lighting apparatus in accordance with claim 1, wherein the diffractive lens surface is structured such that the correction device is achromatic.

5. The lighting apparatus in accordance with claim 1, wherein the correction device is designed as a secondary optical component that is assigned to the light sources arranged in a matrix structure and also to the corresponding primary optical components that are also assigned to these light sources.

6. The lighting apparatus in accordance with claim 1, wherein a ratio of the optical power ($\varphi_{ref}^1$) for the refractive lens surface of the first lens to the optical power ($\varphi_{ref}^2$) for the refractive lens surface of at least one of the second lens and a ratio of the optical power ($\varphi_{diff}^1$) for the diffractive lens surface of the first lens to the optical power ($\varphi_{diff}^2$) for the diffractive lens surface of the second lens is formed through substitution in an Abbe equation and an athermalization equation,
wherein a ratio of the optical power ($\varphi_{ref}^1$) for the refractive lens surface of the first lens to the optical power ($\varphi_{diff}^1$) for the diffractive lens surface of the first lenses and a ratio of the optical power ($\varphi_{ref}^2$) for the refractive lens surface of the second lens to the optical power ($\varphi_{diff}^2$) of the diffractive lens surface of the second lens is formed through substitution in the Abbe equation and the athermalization equation, ensuring that an equation for the total optical power ($\varphi$) can be solved based on the individual optical power values ($\varphi_{ref}^1$, $\varphi_{ref}^2$, $\varphi_{diff}^1$, $\varphi_{diff}^2$) of the refractive lens surfaces and diffractive lens surfaces.

7. The lighting apparatus in accordance with claim 1 wherein the correction device is assigned each of the light sources arranged in a matrix structure as a primary optical component, where a secondary optical component assigned to the same light sources is arranged in front of the primary optical components in the main direction of the beam.

8. A lighting apparatus for vehicles comprising:
a plurality of semiconductor-based light sources;
a projection device for generating a specified light distribution;
a correction device of the projection device, said correction device having at least two lenses, wherein at least two of said at least two lenses are made from different materials from one another, where the surface of at least one of the lenses is designed as a diffractive lens surface for achromatization in a visible wavelength range,
wherein the surfaces of at least two lenses are designed as refractive lens surfaces that have their optical power ($\varphi_{ref}^1$, $\varphi_{ref}^2$) calculated based on at least one of a temperature range and expansion coefficient of the lens material of at least two lenses such that adding the optical power ($\varphi_{ref}^1$, $\varphi_{ref}^2$, $\varphi_{diff}^1$, $\varphi_{diff}^2$) of the lenses yields a predefined total optical power ($\varphi$) of the correction device, and
wherein a first lens and a second lens each feature a diffractive lens surface and a refractive lens surface.

9. The lighting apparatus in accordance with claim 8, wherein the sides of the first lens and second lens facing toward one another are directly adjacent and the surface of the first lens facing toward the light source and the surface of the second lens facing away from the light source feature a diffractive lens surface and refractive lens surface.

10. A lighting apparatus for vehicles comprising:
a plurality of semiconductor-based light sources;
a projection device for generating a specified light distribution;
a correction device of the projection device, said correction device having at least two lenses, wherein at least two of said at least two lenses are made from different materials from one another, where the surface of at least one of the lenses is designed as a diffractive lens surface featuring a Fresnel structure for athermalization;
wherein the lens surface of at least two lenses is designed as a refractive lens surface for achromatization in a visible wavelength range,
wherein the optical power of the refractive lens surface is calculated based on at least one of a temperature range and expansion coefficient of the lens material of at least two lenses such that adding the optical power of the lenses yields a predefined total optical power of the correction device.

11. The lighting apparatus in accordance with claim 10, wherein the refractive lens surface is designed such that the correction device is athermal.

12. The lighting apparatus in accordance with claim 10, wherein the refractive lens surface is designed such that it is aspherical or spherical.

13. The lighting apparatus in accordance with claim 10, wherein the diffractive lens surface is structured such that the correction device is achromatic.

14. The lighting apparatus in accordance with claim 10, wherein the correction device is designed as a secondary optical component that is assigned to the light sources arranged in a matrix structure and also to the corresponding primary optical components that are also assigned to these light sources.

15. The lighting apparatus in accordance with claim 10, wherein a ratio of the optical power for the refractive lens surface of the first lens to the optical power for the refractive lens surface of at least one of the second lens and a ratio of the optical power for the diffractive lens surface of the first lens to the optical power for the diffractive lens surface of the second lens is formed through substitution in an Abbe equation and an athermalization equation,
wherein a ratio of the optical power for the refractive lens surface of the first lens to the optical power for the diffractive lens surface of the first lenses and a ratio of the optical power for the refractive lens surface of the second lens to the optical power of the diffractive lens surface of the second lens is formed through substitution in the Abbe equation and the athermalization equation, ensuring that an equation for the total optical power can be solved based on the individual optical power values of the refractive lens surfaces and diffractive lens surfaces.

16. The lighting apparatus in accordance with claim 10 wherein the correction device is assigned each of the light sources arranged in a matrix structure as a primary optical component, where a secondary optical component assigned to the same light sources is arranged in front of the primary optical components in the main direction of the beam.

17. A lighting apparatus for vehicles comprising:
a plurality of semiconductor-based light sources;
a projection device for generating a specified light distribution;
a correction device of the projection device, said correction device having at least two lenses, wherein at least two of said at least two lenses are made from different materials from one another, where the surface of at least one of the lenses is designed as a diffractive lens surface for athermalization;
wherein the lens surface of at least two lenses is designed as a refractive lens surface for achromatization in a visible wavelength range,
wherein the optical power of the refractive lens surface is calculated based on at least one of a temperature range and expansion coefficient of the lens material of at least two lenses such that adding the optical power of the lenses yields a predefined total optical power of the correction device,
wherein a first lens and a second lens each feature a diffractive lens surface and a refractive lens surface.

18. The lighting apparatus in accordance with claim 17, wherein the sides of the first lens and second lens facing toward one another are directly adjacent and the surface of the first lens facing toward the light source and the surface of the second lens facing away from the light source feature a diffractive lens surface and refractive lens surface.

* * * * *